US009860038B2

United States Patent
Lin et al.

(10) Patent No.: US 9,860,038 B2
(45) Date of Patent: Jan. 2, 2018

(54) RESOURCE CONFIGURATION METHOD, EQUIPMENT AND SYSTEM FOR UPLINK CONTROL CHANNEL

(75) Inventors: Yanan Lin, Beijing (CN); Zukang Shen, Beijing (CN); Xueming Pan, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 82 days.

(21) Appl. No.: 13/501,445

(22) PCT Filed: Sep. 28, 2010

(86) PCT No.: PCT/CN2010/077429
§ 371 (c)(1),
(2), (4) Date: Apr. 11, 2012

(87) PCT Pub. No.: WO2011/044820
PCT Pub. Date: Apr. 21, 2011

(65) Prior Publication Data
US 2012/0207059 A1    Aug. 16, 2012

(30) Foreign Application Priority Data
Oct. 16, 2009  (CN) .......................... 2009 1 0236329

(51) Int. Cl.
*H04L 12/28* (2006.01)
*H04L 5/00* (2006.01)
*H04W 72/04* (2009.01)

(52) U.S. Cl.
CPC ......... *H04L 5/003* (2013.01); *H04W 72/0453* (2013.01)

(58) Field of Classification Search
CPC ... H04L 1/1607; H04L 1/1867; H04L 1/1896; H04L 5/0091; H04L 5/0053;
(Continued)

(56) References Cited

U.S. PATENT DOCUMENTS

2006/0189344 A1* 8/2006 Umesh et al. ................ 455/525
2008/0175195 A1* 7/2008 Cho et al. .................... 370/329
(Continued)

FOREIGN PATENT DOCUMENTS

CN     1893345 A    1/2007
CN   101500260 A    8/2009
(Continued)

OTHER PUBLICATIONS

International Search Report dated Jan. 6, 2011, issued in International Application No. PCT/US2010/077429.
(Continued)

*Primary Examiner* — Charles C Jiang
*Assistant Examiner* — Rose Clark
(74) *Attorney, Agent, or Firm* — Handal & Morofsky LLC

(57) ABSTRACT

The present invention disclosed a resource configuration method for uplink control channel, The method comprises: network side equipment determines downlink carrier that exists cell specific linkage in uplink carrier set and downlink carrier set of User Equipment UE; said network side equipment configures uplink control channel resource for downlink carrier which doesn't exist cell specific linkage according to said determinate result. The method of the present invention is simple and easy to implement, it could use the method in FDD and TDD system to advance system capability of Long Term Evolution multi-carrier update system, and advancing compatibility with the present LTE system primely.

16 Claims, 7 Drawing Sheets

(58) Field of Classification Search
CPC ... H04L 1/0061; H04L 1/0072; H04L 1/1671; H04L 1/1861; H04L 5/001; H04L 5/0007; H04W 72/0453; H04W 72/042; H04W 72/04; H04W 72/1268; H01Q 3/2605
USPC .......... 370/343, 328, 329, 320, 352, 336; 375/260; 455/525
See application file for complete search history.

(56) References Cited

U.S. PATENT DOCUMENTS

| | | | | |
|---|---|---|---|---|
| 2008/0225822 | A1* | 9/2008 | Zhang et al. | 370/343 |
| 2009/0046793 | A1* | 2/2009 | Love et al. | 375/260 |
| 2009/0247174 | A1 | 10/2009 | Zhang et al. | |
| 2012/0063413 | A1* | 3/2012 | Kroener et al. | 370/330 |
| 2013/0016841 | A1* | 1/2013 | Fong et al. | 380/287 |
| 2014/0029545 | A1* | 1/2014 | Kim et al. | 370/329 |
| 2014/0119323 | A1* | 5/2014 | Chung et al. | 370/329 |

FOREIGN PATENT DOCUMENTS

| | | |
|---|---|---|
| CN | 101505538 A | 8/2009 |
| EP | 2471209 A1 | 7/2012 |
| JP | 2008539667 A | 11/2008 |
| JP | 2013503567 A | 1/2013 |
| WO | 2011025816 A1 | 3/2011 |

OTHER PUBLICATIONS

Japanese Patent Office, Japanese Office Action, Japanese Patent Application No. 2012-533468, dated Aug. 21, 2013.
Japanese Patent Office, Japanese Office Action, Japanese Patent Application No. 2012-533468, dated Aug. 26, 2014.
Japanese Patent Office, Japanese Office Action (English Translation), Japanese Patent Application No. 2012-533468, dated Aug. 21, 2013.
Japanese Patent Office, Japanese Office Action (English Translation), Japanese Patent Application No. 2012-533468, dated Aug. 26, 2014.
ZTE, Uplink Control Channel Design for LTE-Advanced, TSG-RAN WG1 #58, Jun. 25-29, 2009, R1-093209, Shenzen, China.
LG Electronics, Consideration on DL/UL CC Linkage for Physical Channel Transmission, 3GPP TSG RAN WGI #58bis, Oct. 12-16, 2009, R1-094169, Miyazaki, Japan.
European Patent Office; Extended European Search Report; May 23, 2017.
Panasonic, PUCCH Resource Allocation Schemes for Carrier Aggregation, 3GPP TSG RAN WG1 #58bis, Oct. 12-16, 2009, R1-093943, Miyazaki, Japan.

* cited by examiner

DL 1, CCE 1 ⟶ control channel resource 1
DL 1, CCE 2 ⟶ control channel resource 2
DL 2, CCE 1 ⟶ control channel resource 3
DL 2, CCE 2 ⟶ control channel resource 4

RESOURCE CONFIGURATION METHOD, EQUIPMENT AND SYSTEM FOR UPLINK CONTROL CHANNEL

The present application claims the priority of the Chinese patent application with the application date of Oct. 16, 2009, the application number of 200910236329.7, and the patent name of "resource configuration method, equipment and system for uplink control channel", all content of the priority application is combined into the present application by quoting.

FIELD OF THE PRESENT INVENTION

The present invention relates generally to the field of Mobile communication technology, and more particularly to resource configuration method, equipment and system for uplink control channel.

BACKGROUND OF THE PRESENT INVENTION

LTE (Long Term Evolution) is evolution of 3G (3rd Generation), LTE improves and enhances the air access technology of 3G, using OFDM (Orthogonal Frequency Division Multiplexing) and MIMO (Multiple Input Multiple Output) for the standard of wireless network evolution. LTE can provide 100 Mbit/s peak rate of downlink and 50 Mbits/s peak rate of uplink in 20 MHz spectral bandwidth, improving the capability of cell-edge users, advancing content of cell, and reducing delay of system. Therein, the technical characteristics of LTE comprise high data rate, packet transport, low delay, wide area coverage and downward compatibility.

Business content of terminal user is exponential growth with quick growth of mobile terminal user number, for sufficing business requirement of increasing terminal user, needing to provide larger bandwidth to suffice requirement about higher peak rate of business of user terminal and higher peak rate of application. Namely, at future mobile communication system, such as B3G (Beyond three Generation) or LTE-A (LTE-Advanced), system would provide higher peak data rate, cell throughput and larger bandwidth; namely, for Long Term Evolution multi-carrier system, needing to support the more wide system bandwidth than LTE system, for example, 100 MHz.

Specifically, for supporting the system bandwidth which more wide than LTE system (For example, 100 MHz), it could be distributing spectrum of 100M bandwidth directly, FIG. 1 is a format diagram of to single spectrum system; it could also be aggregating the spectrum which distributing for existing system and constituting more wide system bandwidth to supply Long Term Evolution multi-carrier system, FIG. 2 is a diagram of spectrum aggregation system. At the spectrum aggregation situation, reference to FIG. 2, uplink carrier and downlink carrier would be configured asymmetrically, namely, user would occupy N≥1 carrier in downlink transmission, and occupying M≥1 carrier in uplink transmission.

The existing technology has finished basal transmission mode of LTE system, the FIG. 3 is a format diagram of transmission mode of FDD system (Frequency Division Duplex), and the FIG. 4 is a format diagram of transmission mode of TDD (Time Division Duplexing) system. Therein, at FIG. 3 and FIG. 4, for every work carrier, defining downlink signaling, downlink data, uplink signaling, uplink data, and transmission relationship between each other respectively.

Specifically, uplink control signaling would occupy the both ends of frequency band, and transmitting by frequency hopping, therein, uplink control signaling would occupy different frequency band to transmit at two slots of a sub-frame. Temporality, system would reserve some resources for uplink control channel transmission at uplink sub-frame as a result of system can't obtain the number of control channel which need to load at uplink sub-frame.

Otherwise, for ACK (Acknowledge Character)/NACK (Negative Acknowledgment Character) feedback transmission of non semi-persistent scheduling, UE (User Equipment) which performs feedback calculates the number ($n_{CCE}$) of resource (therein, channel) which uses by performing the ACK/NACK feedback according to number ($n_{CCE}$) of CCE occupied by downlink control channel PDCCH (Physical Downlink Control Channel) which received by itself, therein, every PDCCH corresponding to a usable uplink control channel resource, and reserving said usable uplink control channel resource for every PDCCH.

In process to achieve the present invention, the inventor finds that there are at least the following problems in the existing technology:

At Long Term Evolution multi-carrier system, when using carrier aggregation, if each uplink carrier reserves corresponding feedback resource for downlink carrier corresponding to uplink carrier, then, uplink carrier would exist serious resource waste, and even leading to without usable uplink resource for data transmission, influencing transmission efficiency of system seriously.

SUMMARY OF THE PRESENT INVENTION

The present invention provides resource configuration method, equipment and system for uplink control channel, so as to save system resource, enhancing transmission efficiency of system.

The embodiment of the present invention provides resource configuration method for uplink control channel to realize above-mentioned purpose, comprising:

network side equipment determining downlink carrier that existing cell specific linkage in uplink carrier set and downlink carrier set of User Equipment UE;

said network side equipment configuring uplink control channel resource for downlink carrier which doesn't exist cell specific linkage according to said determinate result.

The embodiment of the present invention further provides a network side equipment, comprising:

determining module, is used for determining downlink carrier that existing cell specific linkage in uplink carrier set and downlink carrier set of UE;

configuring module, is used for configuring uplink control channel resource for downlink carrier which doesn't exist cell specific linkage according to determinate result of determining module.

The embodiment of the present invention further provides resource configuration method for uplink control channel, comprising:

UE receiving configuration information from network side equipment, said configuration information comprising uplink control channel resource which said network side equipment configuring it for no linkage downlink carrier;

said UE using said uplink control channel resource to transmit the ACK/NACK feedback information corresponding to the PDCCH on said no linkage downlink carrier.

The embodiment of the present invention further provides a user equipment UE, comprising:

transceiver module is used for, receiving configuration information from network side equipment, said configuration information comprising uplink control channel resource which said network side equipment configuring it for no linkage downlink carrier;

transmitting module is used for, using said uplink control channel resource to transmit the ACK/NACK feedback information corresponding to the PDCCH on said no linkage downlink carrier.

The embodiment of the present invention further provides resource configuration system for uplink control channel, comprising network side equipment and UE, therein:

said network side equipment is used for, determining downlink carrier that existing cell specific linkage in uplink carrier set and downlink carrier set of UE; and configuring uplink control channel resource for downlink carrier which doesn't exist cell specific linkage according to determinate result;

said UE is used for, receiving configuration information from network side equipment, said configuration information comprising uplink control channel resource which said network side equipment configuring it for no linkage downlink carrier; and using said uplink control channel resource to transmit the ACK/NACK feedback information corresponding to the PDCCH on said no linkage downlink carrier.

Comparing with existing technology, the embodiment of the present invention bears the following advantages:

At Long Term Evolution multi-carrier system, reducing uplink feedback channel overhead of system, and performing reservation and configuration of resource when using carrier aggregation. The method of the present invention is simple and easy to implement, it could use the method in FDD and TDD system to advance system capability of Long Term Evolution multi-carrier update system, and advancing compatibility with the present LTE system primely.

DETAILED DESCRIPTION OF THE EMBODIMENTS OF THE PRESENT INVENTION

Aiming Long Term Evolution multi-carrier system which uses spectrum aggregation in existing technology, existing the UE which has multifold aggregation capability possibly, base station may configure UE to perform asymmetrical carrier aggregation according to aggregation capability of UE and requirement of specific business, and when carrier index of DL (Downlink) greater than carrier index of UL (Uplink), system needs to reserve corresponding feedback resource for each downlink carrier in each uplink carrier if system wants to support the asymmetrical aggregation of all kinds of ratio neatly, leading to serious resource waste at uplink carrier, even leading to without usable uplink resource for data transmission, and influencing transmission efficiency of system seriously; the embodiment of the present invention provides an uplink control channel resource configuration, the uplink control channel resource configuration is a method which dynamic combines quasi static to perform resource configuration, it would be reducing size of reserved control channel resource in each uplink member carrier observably, accordingly, advancing efficiency of uplink transmission.

Embodiment of this invention will be clearly and completely described with pictures in the following. Apparently, the following embodiment is only a part of this invention, but not the whole invention. All the embodiments achieved by general technical personnel in this field based on this application without creative work belong to the protection scope of the present application.

Figure 1:
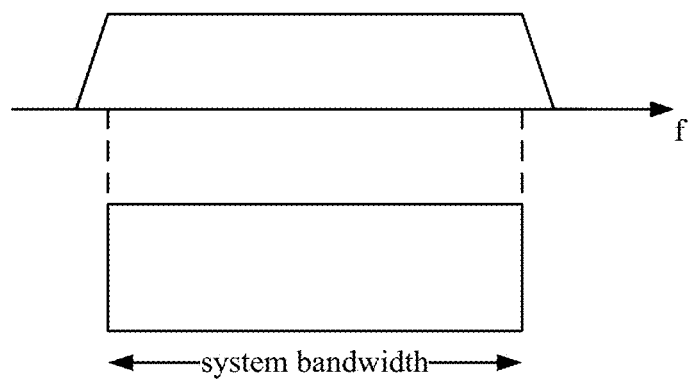
FIG. 1 is a diagram of single spectrum system in existing technology.
Figure 2:
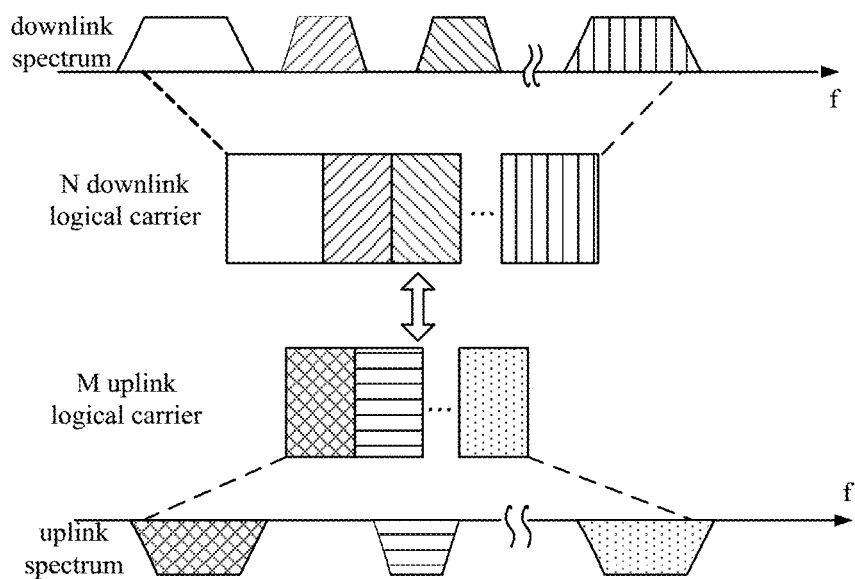
FIG. 2 is a diagram of spectrum aggregation system in existing technology.
Figure 3:
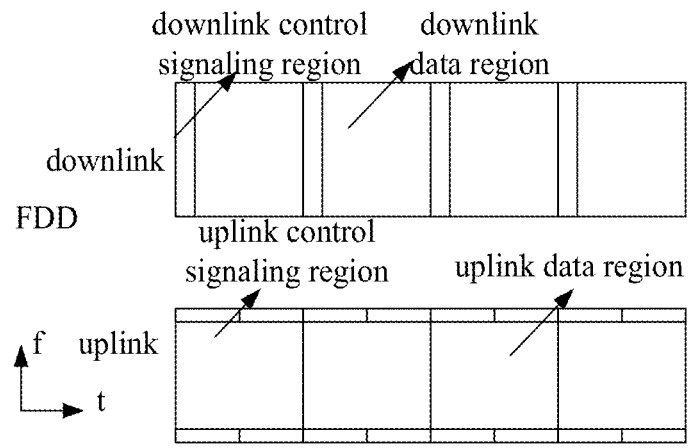
FIG. 3 is a diagram of transmission mode of FDD system in existing technology.
Figure 4:
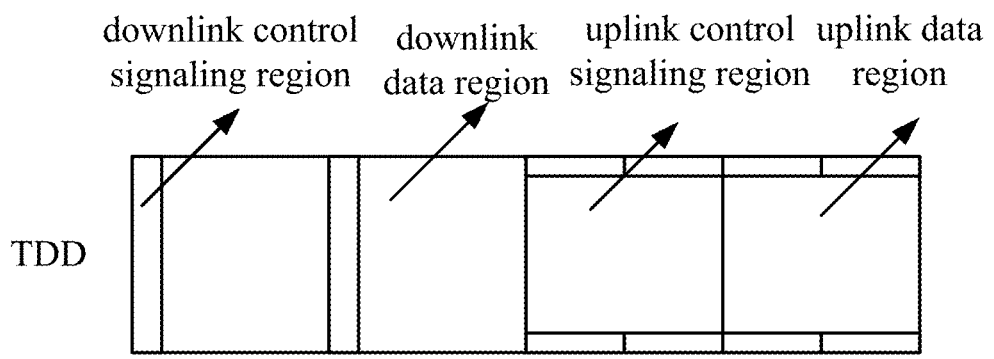
FIG. 4 is a diagram of transmission mode of TDD system in existing technology.
Figure 5:
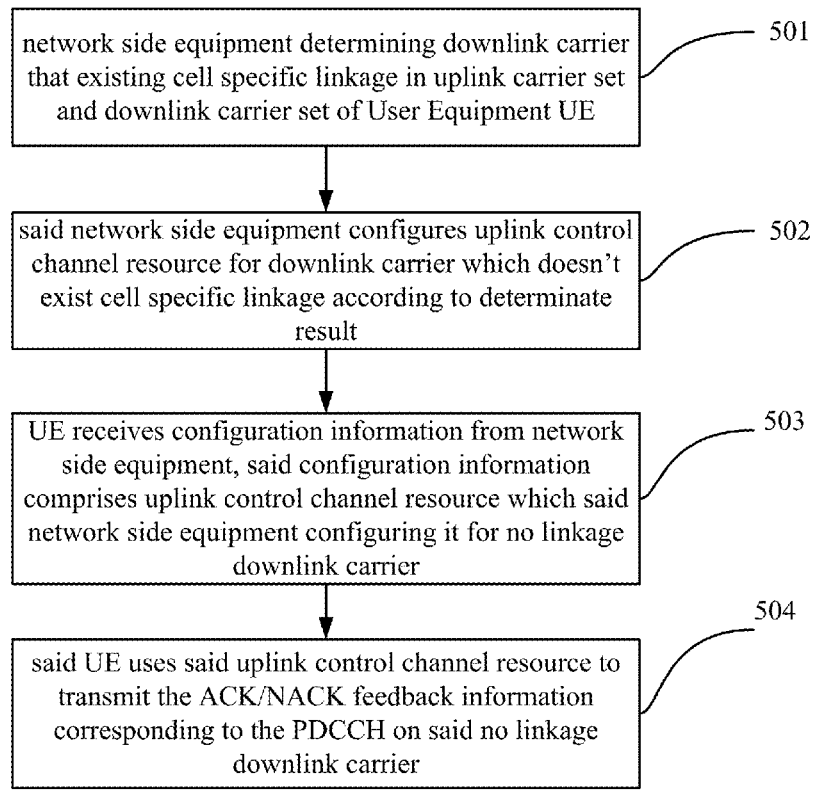
FIG. 5 is a flow diagram of the resource configuration method for uplink control channel in embodiment 1 of the present invention.

The embodiment 1 of the present invention provides resource configuration method for uplink control channel, reference to FIG. 5, comprising the following steps:

Step 501, network side equipment determining downlink carrier that existing cell specific linkage in uplink carrier set and downlink carrier set of User Equipment UE.

Step 502, said network side equipment configures uplink control channel resource for downlink carrier which doesn't exist cell specific linkage according to determinate result.

Specifically, before said network side equipment determines downlink carrier that exists cell specific linkage in uplink carrier set and downlink carrier set of UE, further comprising: said network side equipment determines the carrier set which UE performs aggregation, said carrier set comprises uplink carrier set and downlink carrier set.

When said uplink carrier set comprising cell specific linkage uplink carrier of one downlink carrier of downlink carrier set, said downlink carrier is downlink carrier which existing said cell specific linkage;

When said uplink carrier set doesn't comprise cell specific linkage uplink carrier of one downlink carrier of downlink carrier set, said downlink carrier is the downlink carrier which doesn't exist said cell specific linkage.

When downlink carrier is no linkage downlink carrier, said network side equipment configures uplink control channel resource for downlink carrier which doesn't exist cell specific linkage according to determinate result, comprising: said network side equipment configures uplink control channel resource used by the ACK/NACK feedback information corresponding to physical downlink control channel PDCCH for said UE by higher layer signaling. Therein, said PDCCH comprises: the PDCCH is used for dynamically scheduling downlink data, and/or, indicating downlink semi-persistent scheduling SPS (semi-persistently scheduled) resource release.

when said UE doesn't support inter-carrier scheduling, said network side equipment configures uplink control channel resource used by the ACK/NACK feedback information corresponding to PDCCH for UE by higher layer signaling, comprising: said network side equipment configures N-M' uplink control channels resources for the ACK/NACK feedback information corresponding to said PDCCHs by higher layer signaling; therein, N is the number of aggregated downlink carrier, M is the number of uplink carrier, and M uplink carriers having linkage with M' downlink carriers, M'≤N.

when said UE supports inter-carrier scheduling, said network side equipment configures uplink control channel resource used by the ACK/NACK feedback information corresponding to PDCCH for said UE by higher layer signaling, comprising: said network side equipment configures k uplink control channels resources for the ACK/NACK feedback information corresponding to PDCCHs by higher layer signaling; therein, k∈{0, 1, . . . , N}, N is the number of aggregated downlink carrier.

Further, when said k=0, said network side equipment determining not to transmit PDCCHs of said UE on no linkage downlink carrier;

when said k>0, said network side equipment determining to transmit less than or equal to k PDCCHs of said UE on no linkage downlink carrier.

The embodiment of the present invention, still could comprise:

Step 503, UE receives configuration information from network side equipment, said configuration information comprises uplink control channel resource which said network side equipment configuring it for no linkage downlink carrier.

Step 504, said UE uses said uplink control channel resource to transmit the ACK/NACK feedback information corresponding to the PDCCH on said no linkage downlink carrier. Therein, said configuration information further comprises: the aggregated carrier set information determined by said network equipment, no linkage downlink carrier information and linkage downlink carrier information; said PDCCH comprises: the PDCCH is used for dynamically scheduling downlink data, and/or, indicating downlink semi-persistent scheduling SPS resource release.

Specifically, for no linkage downlink carrier, when configuring more than one uplink control channel resources simultaneously, said UE determines uplink control channel resource used by transmits feedback information corresponding to said PDCCH according to the carrier index located by said PDCCH and the CCE index occupied by said PDCCH.

Specifically, when downlink carrier is linkage downlink carrier, said UE transmits the ACK/NACK feedback information corresponding to PDCCH of said linkage downlink carrier by linkage uplink carrier on said linkage downlink carrier.

For linkage downlink carrier, said UE would determine uplink control channel resource used by transmits feedback information corresponding to said PDCCH according to the location of CCE occupied by PDCCH on linkage downlink carrier.

It is thus clear that, at Long Term Evolution multi-carrier system, reducing uplink feedback channel overhead of system, and performing reservation and configuration of resource by the method of the present invention when using carrier aggregation. The method of the present invention is simple and easy to implement, it could use the method in FDD and TDD system to advance system capability of Long Term Evolution multi-carrier update system, and advancing compatibility with the present LTE system primely.

Figure 6:
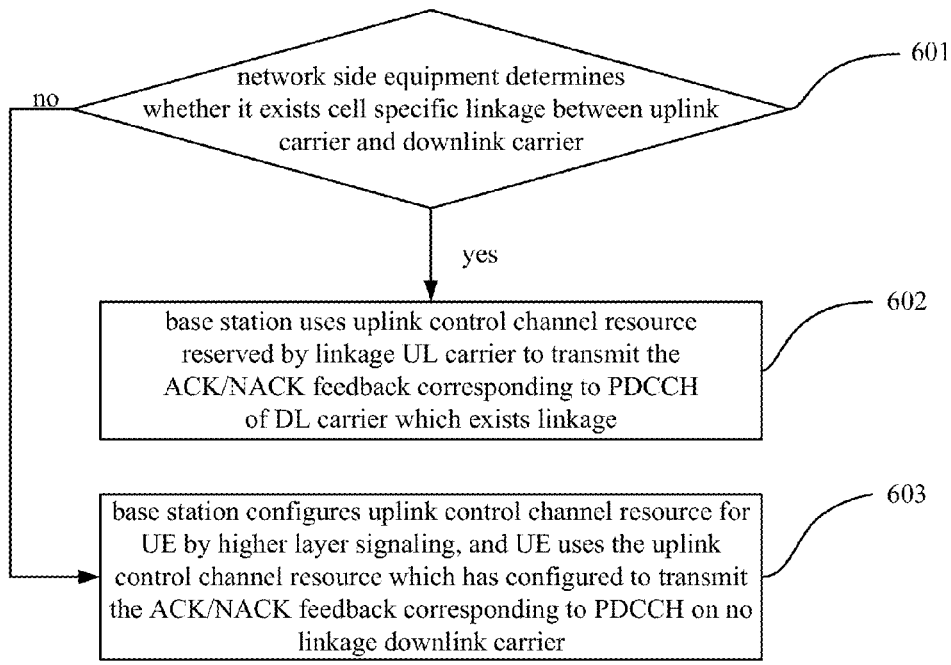
FIG. 6 is a flow diagram of the resource configuration method for uplink control channel in embodiment 2 of the present invention.

The embodiment 1 of the present invention provides resource configuration method for uplink control channel, the uplink control channel resource configuration method is used for Long Term Evolution multi-carrier system which using spectrum aggregation technology, the method is compatible with LTE system, reference to FIG. 6, comprising the following steps:

Step 601, network side equipment determines whether it exists cell specific linkage between uplink carrier and downlink carrier, if cell specific linkage exists, going to step 602, if cell specific linkage doesn't exist, going to step 603. Therein, the network side equipment includes but not limited RNC (Radio Network Controller), NB (Node B), eNB (enhanced Node B), base station and so on, it is necessary explain that the network equipment is not limited abovementioned equipment, all of them should be as the protection scope of the present invention. For convenient description, using base station as the network side equipment of embodiment of the present invention to explain.

Figure 7:
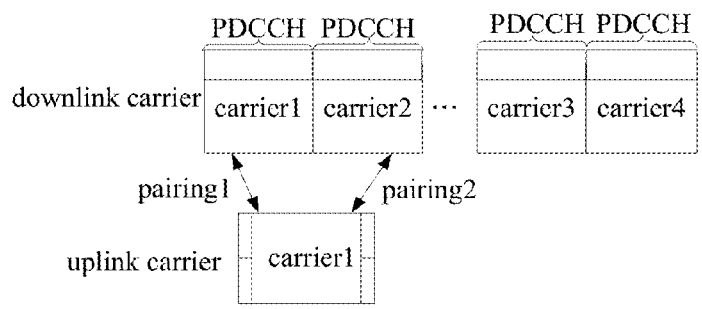
FIG. 7 is a diagram of the downlink carrier has corresponding cell specific linkage with uplink carrier in embodiment of the present invention.

Reference to FIG. 7, for downlink carrier 1 and downlink carrier 2, having cell specific linkage with uplink carrier 1; for downlink carrier 3 and downlink carrier 4, not having cell specific linkage with uplink carrier.

Step 602, base station uses uplink control channel resource reserved by linkage UL carrier to transmit the ACK/NACK feedback corresponding to PDCCH of DL carrier which exists linkage. Therein, base station reserves uplink control channel resource for the PDCCH of DL carrier at linkage UL carrier corresponding to DL carrier, then, UE uses the reserved uplink control channel resource to transmit the ACK/NACK feedback corresponding to PDCCH. Thereinto, the PDCCH comprises: the PDCCH is used for dynamically scheduling downlink data, and/or, indicating downlink semi-persistent scheduling SPS resource release.

Figure 8:
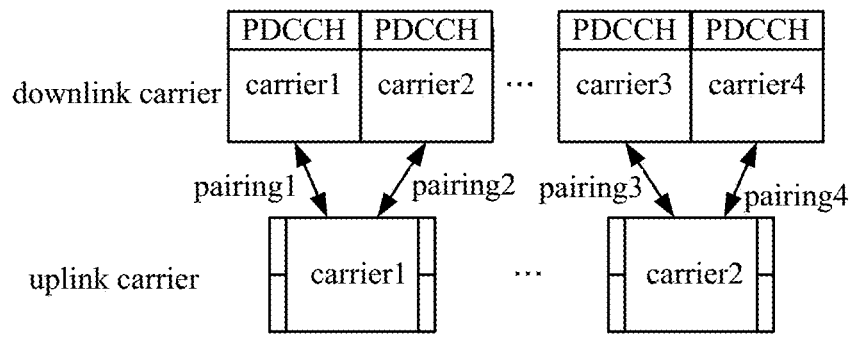
FIG. 8 is a diagram of ACK/NACK corresponding to the PDCCH on downlink carrier feeds back in uplink carrier in embodiment of the present invention.

Specifically, it is a cell specific linkage between uplink carrier and downlink carrier in multi-carrier system, through the linkage, determining the uplink carrier which performs the ACK/NACK feedback corresponding to PDCCH on each downlink carrier, reference to FIG. 8.

For the PDCCH of DL carrier 1, the uplink control channel resource determined by CCE index at UL carrier 1, therein, DL carrier 1 has corresponding linkage (linkage 1) with UL carrier 1, the ACK/NACK corresponding to PDCCH of DL carrier 1 would perform feedback at UL carrier 1;

Similarly, uplink control channel corresponding to PDCCH of DL carrier 2 at UL carrier 1, uplink control channel corresponding to PDCCH of DL carrier 3 and DL carrier 4 at UL carrier 2. Therein, DL carrier 2 has linkage (linkage 2) with UL carrier 1, the ACK/NACK corresponding to PDCCH of DL carrier 2 would perform feedback at UL carrier 1; DL carrier 3 has linkage (linkage 3) with UL carrier 2, the ACK/NACK corresponding to PDCCH of DL carrier 3 would perform feedback at UL carrier 2; DL carrier 4 has linkage (linkage 4) with UL carrier 2, the ACK/NACK corresponding to PDCCH of DL carrier 4 would perform feedback at UL carrier 2.

Further, base station obtains number of DL which needs to aggregate is N when UE needs to perform carrier aggregation, number of UL is M. If M UL carrier have linkage with M' DL carrier, therein, M'≤N (M' DL carrier are partial or all of N DL carrier which needs to aggregate), then, UE would use reserved uplink control channel resource of linkage UL carrier to transmit the ACK/NACK feedback corresponding to PDCCH of DL carrier (therein, M' DL carrier) which exists linkage UL carrier, there is no longer detailed explanation.

In embodiment of the present invention, for DL carrier which existing linkage, UE would determine the uplink control channel resource which is used for transmitting feedback information corresponding to said PDCCH according to CCE location occupied by PDCCH on linkage downlink carrier, there is no longer detailed explanation at embodiment of the present invention.

Step 603, base station configures uplink control channel resource for UE by higher layer signaling, and UE uses the uplink control channel resource which has configured to transmit the ACK/NACK feedback corresponding to PDCCH on no linkage downlink carrier.

Explaining the process of linkage by two situations:

(1) If UE doesn't support inter-carrier scheduling, therein, transmitting PDCCH corresponding to PDSCH (Physical Downlink Shared Channel) of each carrier barely at the present carrier, then base station configures uplink control channel resource for UE by higher layer signaling (for example RRC (Radio Resource Control) signaling), and UE uses the uplink control channel resource which has configured to transmit the ACK/NACK feedback corresponding to PDCCH on no linkage downlink carrier.

Further, base station would configure N-M' uplink control channels resources for UE by higher layer signaling, therein, the number of DL carrier which needs to aggregate is N, the number of UL carrier is M, and M UL carrier have linkage with M' DL carrier, therein, for M' DL carrier, reserving uplink control channel resource at M UL carrier corresponding to itself, and transmitting the ACK/NACK feedback at the M UL carrier, the process has explained detailedly at step 602, the present step no longer explains detailedly.

Base station configures uplink control channel resource for other N-M' no linkage DL carrier by higher layer signaling, and UE uses the uplink control channel resource which has configured to transmit the ACK/NAKC feedback corresponding to N-M' DL carrier.

For example, when UE occupies N=3 downlink carrier, the downlink carrier respectively is: DL carrier 1, DL carrier 2 and DL carrier 3, at 3 downlink carrier, when DL carrier 1 and DL carrier 2 aggregate with uplink carrier (for example, UL carrier 1), then, M=1, M'=2, N−M'=1; at the present, base station need configure 1 uplink control channel resource for UE by higher layer signaling, and UE uses the uplink control channel resource to transmit the ACK/NACK information corresponding to PDCCH of DL carrier 3.

(2) If UE supports inter-carrier scheduling, therein, PDCCH corresponding to PDSCH of different carrier could transmit at same DL carrier, then, base station need configure uplink control channel resource for UE by higher layer signaling (for example, RRC signaling), and UE uses the uplink control channel resource which has configured to transmit the ACK/NACK feedback corresponding to PDCCH on no linkage downlink carrier.

Further, base station could configure k∈{0, 1, . . . , N} uplink control channel resource for UE by higher layer signaling, and UE uses the k uplink control channels resources to transmit the ACK/NACK information corresponding to PDCCHs of no linkage DL carrier. At the present, base station need limit that the most number of the PDCCHs is k.

When k=0, base station couldn't transmit PDCCH of UE at no linkage DL carrier; for example, UE occupies N=4 downlink carrier, respectively is; DL carrier 1, DL carrier 2, DL carrier 3 and DL carrier 4; DL carrier 1 and DL carrier 2 have linkage with M=1 uplink carrier (therein, UL carrier 1), base station configures k usable uplink control channel resource by higher layer signaling, when k=0, all of PDCCH only transmit at DL carrier 1 and DL carrier 2, accordingly, using the UL carrier 1 to transmit the ACK/NACK feedback information corresponding to PDCCH, reference to FIG. 9.

Figure 9:
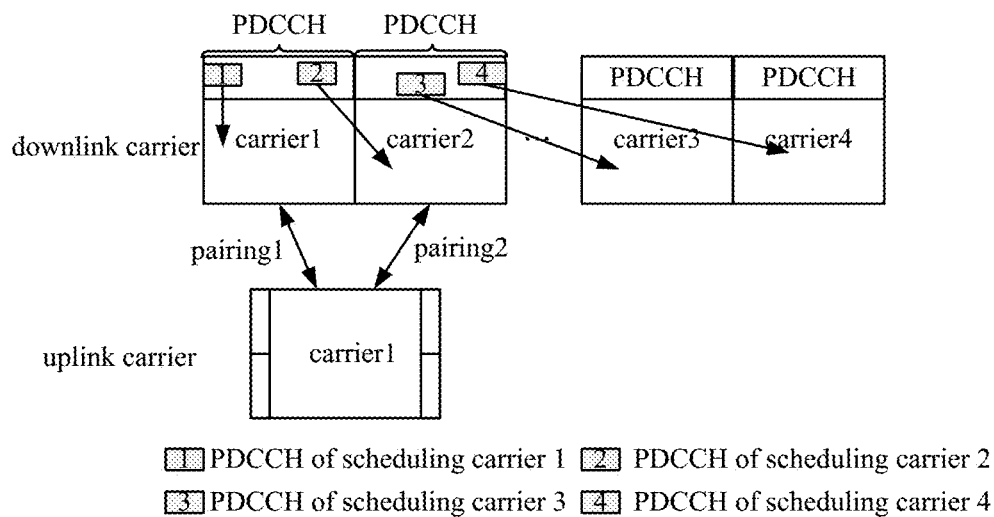
FIG. 9 is a transmission diagram of ACK/NACK feedback of inter-carrier scheduling when k=0.

Reference to FIG. 9, needing to transmit PDCCH of scheduling carrier 1, PDCCH of scheduling carrier 2, PDCCH of scheduling carrier 3 and PDCCH of scheduling carrier 4 at DL carrier 1 and DL carrier 2, then, using UL carrier 1 to transmit the ACK/NACK feedback information corresponding to PDCCH.

Figures 10, 11:
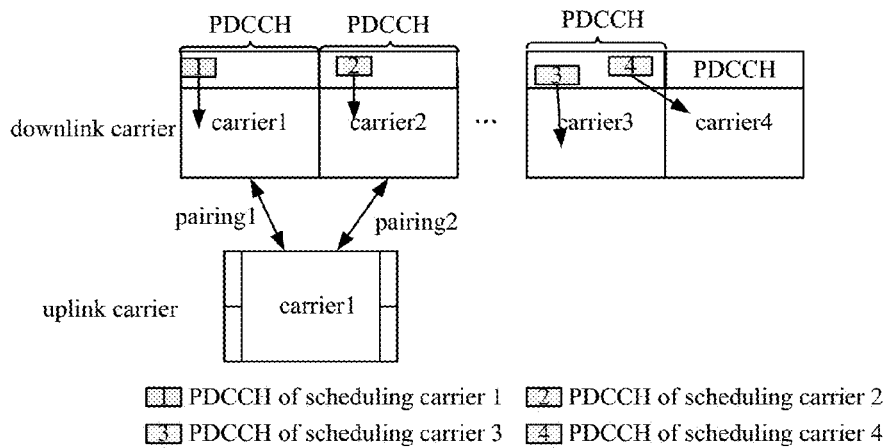
FIG. 10 is a transmission diagram of ACK/NACK feedback of inter-carrier scheduling when k=2.
FIG. 11 is a diagram of the corresponding relationship between uplink control channel resource and PDCCH when configuring many uplink control channel resources in embodiment of the present invention.

When k>0, base station could transmit less than or equal to k PDCCH at no linkage downlink carrier; for example, when base station configures 2 uplink control channels resources for UE by higher layer signaling, then, k=2, using uplink control channels resources configured by higher layer to transmit the ACK/NACK information corresponding to 2 PDCCH which transmit on no linkage DL. FIG. 10 is a transmission diagram of the ACK/NACK feedback of inter-carrier scheduling when k=2.

Reference to FIG. 10, transmitting PDCCH of scheduling carrier 1 and PDCCH of scheduling carrier 2 at DL carrier 1 and DL carrier 2 respectively, then, using UL carrier 1 to transmit the ACK/NACK information corresponding to the PDCCH of scheduling carrier 1 and the ACK/NACK information corresponding to the PDCCH of scheduling carrier 2. Using DL carrier 3 to transmit the PDCCH of scheduling carrier 3 and scheduling carrier 4, using the 2 uplink control channels resources which base station configures for UE to transmit the ACK/NACK information corresponding to the PDCCH of scheduling carrier 1 and the ACK/NACK information corresponding to the PDCCH of scheduling carrier 2.

Specifically, when configuring multi-uplink control channels resources synchronously (for example, base station configures 2 uplink control channels resources for UE by higher layer signaling), then, determining corresponding relationship between uplink control channel resource and PDCCH according to carrier index of PDCCH and CCE index implicit occupied by PDCCH. For example, at the DL carrier of the least carrier index, the PDCCH of the least CCE index corresponds to uplink control channel resource configured first, first, performing array according to CCE ascending sequence, then, performing array according to carrier index ascending sequence, reference to FIG. 11. Therein, for no linkage downlink carrier, when configuring multi-uplink control channel resources synchronously, UE determining uplink control channel resource which is used for transmitting feedback information corresponding to PDCCH according to carrier index of PDCCH and CCE index occupied by PDCCH, there is no longer detailed explanation at embodiment of the present invention.

It needs to explain that, above-mentioned base station arbitrarily configures multi-uplink control channels resources for UE by higher layer signaling according to actual requirement, there is no longer detailed explanation at embodiment of the present invention.

It is thus clear that, at Long Term Evolution multi-carrier system, reducing uplink feedback channel overhead of system, and performing reservation and configuration of resource by the method of the present invention when using carrier aggregation. The method of the present invention is simple and easy to implement, it could use the method in FDD and TDD system to advance system capability of Long Term Evolution multi-carrier update system, and advancing compatibility with the present LTE system primely.

Figure 12:
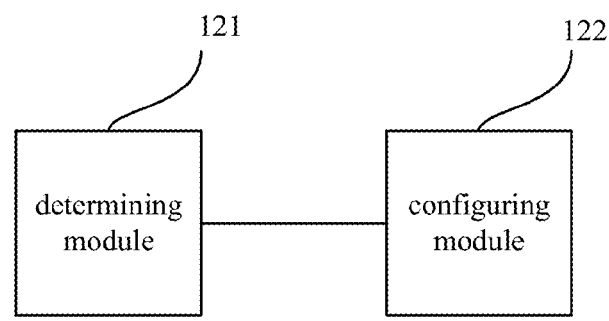
FIG. 12 is a structure diagram of network side equipment in embodiment 3 of the present invention.

The embodiment 3 of the present invention provides a network side equipment, reference to FIG. 12, comprising:

Determining module 121, is used for determining downlink carrier that existing cell specific linkage in uplink carrier set and downlink carrier set of UE;

Configuring module 122, is used for configuring uplink control channel resource for downlink carrier which doesn't exist cell specific linkage according to determinate result of determining module 121.

Specifically, said determining module 121 is further used for, determining the carrier set which said UE performing aggregation, said carrier set comprising uplink carrier set and downlink carrier set.

Said determining module 121 is further used for, when said uplink carrier set comprising cell specific linkage uplink carrier of one downlink carrier of downlink carrier set, determining said downlink carrier is downlink carrier which existing said cell specific linkage;

When said uplink carrier set doesn't comprise cell specific linkage uplink carrier of one downlink carrier of downlink carrier set, determining said downlink carrier is the downlink carrier which doesn't exist said cell specific linkage.

When downlink carrier is no linkage downlink carrier,

Said configuring module 122 is specifically used for, configuring uplink control channel resource used by the ACK/NACK feedback information corresponding to physical downlink control channel PDCCH for said UE by higher layer signaling. Thereinto, said PDCCH comprising: the PDCCH is used for dynamically scheduling downlink data, and/or, indicating downlink semi-persistent scheduling SPS resource release.

When said UE doesn't support inter-carrier scheduling,

Said configuring module 122 is further used for, configuring N-M' uplink control channels resources for the ACK/NACK feedback information corresponding to said PDCCHs by higher layer signaling;

Therein, N is the number of aggregated downlink carrier, M is the number of uplink carrier, and M uplink carriers having linkage with M' downlink carriers, M'≤N.

When said UE supporting inter-carrier scheduling,

Said configuring module 122 is further used for, configuring k uplink control channels resources for the ACK/NACK feedback information corresponding to PDCCHs by higher layer signaling;

Therein, k∈{0, 1, ..., N}, N is the number of aggregated downlink carrier.

When said k=0, said configuring module 121 is further used for, determining not to transmit PDCCHs of said UE on no linkage downlink carrier;

When said k>0, said configuring module 122 is further used for, determining to transmit less than or equal to k PDCCHs of said UE on no linkage downlink carrier.

It is thus clear that, at Long Term Evolution multi-carrier system, reducing uplink feedback channel overhead of system, and performing reservation and configuration of resource by the equipment of the present invention when using carrier aggregation. The method of the present invention is simple and easy to implement, it could use the method in FDD and TDD system to advance system capability of Long Term Evolution multi-carrier update system, and advancing compatibility with the present LTE system primely.

Therein, modules in the above-mentioned embodiments can be integrated in one entirety, also can be deployed separately, can be combined into one module, also can be further split into multiple sub-modules.

Figure 13:
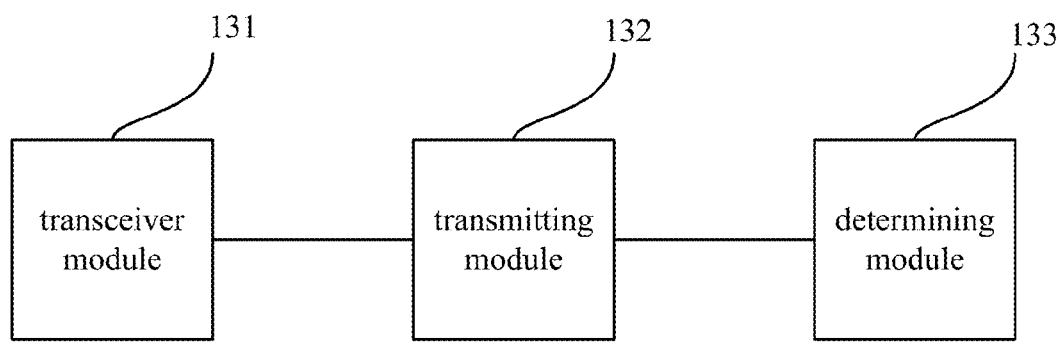
FIG. 13 is a structure diagram of user equipment in embodiment 4 of the present invention.

The embodiment 4 of the present invention further provides a user equipment UE, reference to FIG. 13, comprising:

Transceiver module 131 is used for, receiving configuration information from network side equipment, said configuration information comprising uplink control channel resource which said network side equipment configuring it for no linkage downlink carrier;

Transmitting module 132 is used for, using said uplink control channel resource to transmit the ACK/NACK feedback information corresponding to the PDCCH on said no linkage downlink carrier. Therein, said configuration information further comprises: the aggregated carrier set information determined by said network equipment, no linkage downlink carrier information and linkage downlink carrier information;

Said PDCCH comprises: the PDCCH is used for dynamically scheduling downlink data, and/or, indicating downlink semi-persistent scheduling SPS resource release.

When downlink carrier is linkage downlink carrier, said method further comprising:

Said transmitting module 132 is further used for, transmitting the ACK/NACK feedback information corresponding to PDCCH on said linkage downlink carrier by linkage uplink carrier on said linkage downlink carrier.

When configuring more than one uplink control channels resources simultaneously, said method further comprising:

Determining module 133 is used for, determining uplink control channel resource used by transmitting feedback information corresponding to said PDCCHs according to the carrier index located by said PDCCHs and the CCE index occupied by said PDCCHs.

It is thus clear that, at Long Term Evolution multi-carrier system, reducing uplink feedback channel overhead of system, and performing reservation and configuration of resource by the equipment of the present invention when using carrier aggregation. The method of the present invention is simple and easy to implement, it could use the method in FDD and TDD system to advance system capability of Long Term Evolution multi-carrier update system, and advancing compatibility with the present LTE system primely.

Therein, modules in the above-mentioned embodiments can be integrated in one entirety, also can be deployed separately, can be combined into one module, also can be further split into multiple sub-modules.

The embodiment of the present invention further comprises resource configuration system for uplink control channel, comprising network side equipment and UE, therein, Said network side equipment is used for, determining downlink carrier that existing cell specific linkage in uplink carrier set and downlink carrier set of UE; and configuring uplink control channel resource for downlink carrier which doesn't exist cell specific linkage according to determinate result;

Said UE is used for, receiving configuration information from network side equipment, said configuration information comprising uplink control channel resource which said network side equipment configuring it for no linkage downlink carrier; and using said uplink control channel resource to transmit the ACK/NACK feedback information corresponding to the PDCCH on said no linkage downlink carrier.

In the embodiment of the present invention, when said uplink carrier set comprises cell specific linkage uplink carrier of one downlink carrier of downlink carrier set, said downlink carrier is downlink carrier which exists said cell specific linkage;

When said uplink carrier set doesn't comprise cell specific linkage uplink carrier of one downlink carrier of downlink carrier set, said downlink carrier is the downlink carrier which doesn't exist said cell specific linkage.

Specifically, said network side equipment is further used for, determining the carrier set which said UE performing aggregation, said carrier set comprising uplink carrier set and downlink carrier set. When downlink carrier is no linkage downlink carrier, configuring uplink control channel resource used by the ACK/NACK feedback information corresponding to physical downlink control channel PDCCH for said UE by higher layer signaling. Said PDCCH comprises: the PDCCH is used for dynamically scheduling downlink data, and/or, indicating downlink semi-persistent scheduling SPS resource release.

Specifically, when said UE doesn't support inter-carrier scheduling, configuring N-M' uplink control channels resources for the ACK/NACK feedback information corresponding to said PDCCHs by higher layer signaling; therein, N is the number of aggregated downlink carrier, M is the number of uplink carrier, and M uplink carriers having linkage with M' downlink carriers, M'≤N.

When said UE supporting inter-carrier scheduling, configuring k uplink control channels resources for the ACK/NACK feedback information corresponding to PDCCHs by higher layer signaling; therein, k∈{0, 1, . . . , N}, N is the number of aggregated downlink carrier.

When said k=0, said network side equipment determines not to transmit PDCCH of said UE on no linkage downlink carrier;

When said k>0, said network side equipment determine to transmit less than or equal to k PDCCH of said UE on no linkage downlink carrier.

Said UE is further used for, when downlink carrier is linkage downlink carrier, transmitting the ACK/NACK feedback information corresponding to PDCCH of said linkage downlink carrier by linkage uplink carrier on said linkage downlink carrier.

When configuring more than one uplink control channels resources simultaneously, determining uplink control channel resource used by transmitting feedback information corresponding to said PDCCHs according to the carrier index located by said PDCCHs and the CCE index occupied by said PDCCHs.

It is thus clear that, at Long Term Evolution multi-carrier system, reducing uplink feedback channel overhead of system, and performing reservation and configuration of resource by the system of the present invention when using carrier aggregation. The method of the present invention is simple and easy to implement, it could use the method in FDD and TDD system to advance system capability of Long Term Evolution multi-carrier update system, and advancing compatibility with the present LTE system primely.

Through the description of the embodiments above, the technical personnel in this field can understand clearly that the present invention can be implemented by software and necessary current hardware platform. Of course, it also can be implemented by hardware, but in many situations the former is the better. Based on this understanding, essence or section with contribution to existing technology of the technical program of the present invention can be embodied by a form of software product which can be stored in a storage medium, including a number of instructions for making a computer equipment (such as mobile phone, personal computers, servers, or network equipments, etc.) implement the methods described in the embodiments of the present invention.

The technical personnel in this field can understand that drawing is diagram of only one embodiment, the unit or process of drawing is not necessarily for implementing the present invention.

The technical personnel in this field can understand the units of the equipments in the embodiments can be set in the equipments according to the description of the embodiments, also can be set in one or more equipments different from the embodiments. Units in the above-mentioned embodiments can be integrated in one entirety, also can be deployed separately, can be combined into one module, also can be further split into multiple sub-modules.

Serial numbers of the above-mentioned embodiments of the present invention are only used for description, it does not express whether the embodiment is excellent or poor.

The public content is only some specific embodiments of the present invention. However, the invention is not limited by these, whatever modifications can be imagined by the technical personnel in this field all should be in the protective range of the present invention.

The invention claimed is:

1. Resource configuration method for uplink control channel, comprising:

network side equipment determining whether there exists cell specific linkage between downlink carriers in downlink carrier set of User Equipment (UE) and uplink carriers in uplink carrier set of UE;

the network side equipment configuring uplink control channel resource for downlink carrier which doesn't exist cell specific linkage according to the determinate result;

wherein the network side equipment determining whether there exists cell specific linkage between downlink carriers in the downlink carrier set of UE and uplink carriers in the uplink carrier set of UE comprises: when the uplink carrier set comprises cell specific linkage uplink carrier of one downlink carrier in the downlink carrier set, the downlink carrier is downlink carrier which exists the cell specific linkage; when the uplink carrier set doesn't comprise cell specific linkage uplink carrier of one downlink carrier in the downlink carrier set, the downlink carrier is the downlink carrier which doesn't exist the cell specific linkage;

wherein when the downlink carrier is the downlink carrier which doesn't exist the cell specific linkage, the network side equipment configuring uplink control channel resource for the downlink carrier which doesn't exist cell specific linkage according to determinate result, comprises: the network side equipment configuring uplink control channel resource for transmitting Acknowledge/Negative Acknowledge (ACK/NACK) feedback information corresponding to physical downlink control channel (PDCCH) on the downlink carrier which doesn't exist the cell specific linkage, for the UE by higher layer signaling.

2. The method of claim 1, wherein, before the network side equipment determining whether there exists cell specific linkage between downlink carriers in the downlink carrier set of User Equipment (UE) and uplink carriers in the uplink carrier set of UE, further comprising: the network side equipment determining one carrier set which the UE performing aggregation, the carrier set comprising the uplink carrier set and the downlink carrier set.

3. The method of claim 1, wherein, the PDCCH comprising: the PDCCH being used for dynamically scheduling downlink data, and/or, indicating downlink semi-persistent scheduling SPS resource release.

4. The method of claim 1, wherein, when the UE doesn't support inter-carrier scheduling, the network side equipment configuring uplink control channel resource for transmitting the ACK/NACK feedback information corresponding to PDCCH for the UE by higher layer signaling, comprises: the network side equipment configuring N-M' uplink control channels resources for the ACK/NACK feedback information corresponding to the PDCCHs by higher layer signaling; therein, N is the number of aggregated downlink carrier, M is the number of uplink carrier, and M uplink carriers having linkage with M' downlink carriers, M'≤N; when the UE supporting inter-carrier scheduling, the network side equipment configuring uplink control channel resource for transmitting the ACK/NACK feedback information corresponding to PDCCH for the UE by higher layer signaling, comprises: the network side equipment configuring k uplink control channels resources for the ACK/NACK feedback information corresponding to PDCCHs by higher layer signaling; therein, k∈{0, 1, . . . , N}, N is the number of aggregated downlink carrier.

5. The method of claim 4, further comprising: when the k=0, the network side equipment determining not to transmit PDCCHs of the UE on no linkage downlink carrier; when the k>0, the network side equipment determining to transmit less than or equal to k PDCCHs of the UE on no linkage downlink carrier.

6. A network side equipment, comprising: a non-transitory storage medium that stores machine-readable program codes and a processor configured to read and execute the program codes stored in the storage medium to,
determine whether there exists cell specific linkage between downlink carriers in downlink carrier set of UE and uplink carriers in uplink carrier set of UE; and configure uplink control channel resource for downlink carrier which doesn't exist cell specific linkage according to determinate result of determining module;
wherein, the processor is further configured to, when the uplink carrier set comprises cell specific linkage uplink carrier of one downlink carrier in the downlink carrier set, determine the downlink carrier as downlink carrier which exists the cell specific linkage; when the uplink carrier set doesn't comprise cell specific linkage uplink carrier of one downlink carrier in downlink carrier set, determine the downlink carrier as the downlink carrier which doesn't exist the cell specific linkage;
wherein when the downlink carrier is the linkage downlink carrier which doesn't exist the cell specific linkage, the processor is further configured to configure, uplink control channel resource for transmitting Acknowledge/Negative Acknowledge (ACK/NACK) feedback information corresponding to physical downlink control channel (PDCCH) on the downlink carrier which doesn't exist the cell specific linkage, for the UE by higher layer signaling.

7. The network side equipment of claim 6, wherein, the processor is further configured to determine one carrier set which the UE performing aggregation, the carrier set comprising the uplink carrier set and the downlink carrier set.

8. The network side equipment of claim 6, wherein, when the UE doesn't support inter-carrier scheduling, the processor is further configured to configure, N-M' uplink control channels resources for the ACK/NACK feedback information corresponding to the PDCCHs by higher layer signaling; therein, N is the number of aggregated downlink carrier, M is the number of uplink carrier, and M uplink carriers having linkage with M' downlink carriers, M'≤N;
when the UE supporting inter-carrier scheduling, the processor is further configured to configure, k uplink control channels resources for the ACK/NACK feedback information corresponding to PDCCHs by higher layer signaling; therein, k∈{0, 1, . . . , N}, N is the number of aggregated downlink carrier.

9. The network side equipment of claim 8, wherein, when the k=0, the processor is further configured to determine not to transmit PDCCHs of the UE on the downlink carrier which doesn't exist the cell specific linkage; when said k>0, the processor is further configured to determine to transmit less than or equal to k PDCCHs of the UE on the downlink carrier which doesn't exist the cell specific linkage.

10. Resource configuration method for uplink control channel, comprising:
UE receiving configuration information from network side equipment, the configuration information comprising uplink control channel resource which is configured by the network side equipment for downlink carrier which doesn't exist cell specific linkage;
the UE using the uplink control channel resource to transmit Acknowledge/Negative Acknowledge (ACK/NACK) feedback information corresponding to physical downlink control channel (PDCCH) on the downlink carrier which doesn't exist the cell specific linkage;
wherein when uplink carrier set of the UE doesn't comprise cell specific linkage uplink carrier of one downlink carrier in downlink carrier set of the UE, the one downlink carrier is the downlink carrier which doesn't exist the cell specific linkage.

11. The method of claim 10, wherein, the configuration information further comprises: aggregated carrier set information determined by the network equipment, information of downlink carrier which doesn't exist the cell specific linkage and information of downlink carrier which exists the cell specific linkage; the PDCCH comprises: the PDCCH being used for dynamically scheduling downlink data, and/or, indicating downlink semi-persistent scheduling SPS resource release.

12. The method of claim 11, wherein, when downlink carrier is downlink carrier which exists the cell specific linkage, the method further comprises: the UE transmitting ACK/NACK feedback information corresponding to PDCCH on the downlink carrier which exists the cell specific linkage by cell specific linkage uplink carrier of the downlink carrier which exists the cell specific linkage.

13. The method of claim 10, wherein, when configuring more than one uplink control channels resources simultaneously, the method further comprises: the UE determining uplink control channel resource for transmitting feedback information corresponding to the PDCCH according to carrier index located by the PDCCH and control channel element (CCE) index occupied by the PDCCH.

14. A user equipment UE, comprising: a non-transitory storage medium that stores machine-readable program codes and a processor configured to read and execute the program codes stored in the storage medium to,
receive configuration information from network side equipment, the configuration information comprising uplink control channel resource which is configured by the network side equipment for downlink carrier which doesn't exist cell specific linkage;

use the uplink control channel resource to transmit Acknowledge/Negative Acknowledge (ACK/NACK) feedback information corresponding to physical downlink control channel (PDCCH) on the downlink carrier which doesn't exist the cell specific linkage;

wherein when uplink carrier set of the UE doesn't comprise cell specific linkage uplink carrier of one downlink carrier in downlink carrier set of the UE, the one downlink carrier is the downlink carrier which doesn't exist the cell specific linkage.

15. The UE of claim 14, wherein, when downlink carrier is downlink carrier which exists the cell specific linkage, the processor is further configured to transmit ACK/NACK feedback information corresponding to PDCCH on the downlink carrier which exists the cell specific linkage by cell specific linkage uplink carrier of the downlink carrier which exists the cell specific linkage.

16. The UE of claim 14, wherein, when configuring more than one uplink control channel resources simultaneously, the processor is further configured to determine uplink control channel resource for transmitting feedback information corresponding to the PDCCH according to carrier index located by the PDCCH and control channel element (CCE) index occupied by the PDCCH.

* * * * *